(12) United States Patent
Alexander

(10) Patent No.: US 8,602,423 B1
(45) Date of Patent: Dec. 10, 2013

(54) WHEELED LAUNDRY CARRYING DEVICE

(76) Inventor: Christine A. Alexander, Toronto (CA)

( * ) Notice: Subject to any disclaimer, the term of this patent is extended or adjusted under 35 U.S.C. 154(b) by 247 days.

(21) Appl. No.: 13/069,442

(22) Filed: Mar. 23, 2011

(51) Int. Cl.
*B62D 39/00* (2006.01)
(52) U.S. Cl.
USPC ............... 280/33.998; 280/47.34; 280/30
(58) Field of Classification Search
USPC ............ 280/47.34, 79.2, 47.17, 651, 47.35, 280/47.26, 30, 641, 33.992, 33.998
See application file for complete search history.

(56) References Cited

U.S. PATENT DOCUMENTS

| | | | |
|---|---|---|---|
| 3,252,712 A * | 5/1966 | Klemm | 280/79.2 |
| 4,220,345 A | 9/1980 | Johnson et al. | |
| 5,040,811 A * | 8/1991 | Busken et al. | 280/47.34 |
| 5,649,718 A * | 7/1997 | Groglio | 280/641 |
| D419,734 S | 1/2000 | Adams | |
| 6,036,204 A | 3/2000 | Craft et al. | |
| 6,070,899 A * | 6/2000 | Gines | 280/651 |
| D440,020 S | 4/2001 | Ronson et al. | |
| 6,910,696 B2 * | 6/2005 | Bargery et al. | 280/30 |
| 7,051,853 B2 * | 5/2006 | Brown | 280/47.26 |
| 7,252,295 B2 | 8/2007 | Bludworth | |
| 7,827,709 B2 * | 11/2010 | McCabe | 38/143 |
| 7,836,617 B2 * | 11/2010 | McCabe | 38/143 |
| 8,172,256 B2 * | 5/2012 | Fine | 280/651 |
| 2006/0022419 A1 * | 2/2006 | Phillips, II | 280/47.35 |
| 2006/0208439 A1 * | 9/2006 | Depasquale et al. | 280/47.17 |
| 2008/0098773 A1 | 5/2008 | Beeks | |
| 2009/0019654 A1 * | 1/2009 | Lingren | 15/115 |
| 2011/0304113 A1 * | 12/2011 | Clover | 280/47.34 |

OTHER PUBLICATIONS

Large Wheeled Stacking Basket. The Container Store. http://reviews.containerstore.com/1626/10025921/large-wheeled-stacking-basket-reviews/reviews.htm Accessed May 7, 2010.
Rubbermaid Wheeled Hamper. Amazon.com. http://www.amazon.com/Rubbermaid-Wheeled-Hamper-2d-White/dp/B000TCYA14 Accessed May 7, 2010.

* cited by examiner

*Primary Examiner* — Hau Phan
(74) *Attorney, Agent, or Firm* — Montgomery Patent & Design; Robert C. Montgomery

(57) ABSTRACT

A wheeled laundry basket includes a basket, a plurality of wheel assemblies, and a rope pull. Each wheel assembly includes a rotating caster integrally connected to the basket. A top exterior edge of the basket provides integral connection to the rope pull connected on both ends to the basket in order to provide a flexible extended handle for steering and rolling the basket along a ground surface.

16 Claims, 7 Drawing Sheets

WHEELED LAUNDRY CARRYING DEVICE

RELATED APPLICATIONS

The present invention was first described in a notarized Official Record of Invention on Feb. 25, 2010, that is on file at the offices of Montgomery Patent and Design, LLC, the entire disclosures of which are incorporated herein by reference.

FIELD OF THE INVENTION

The present invention relates generally to laundry baskets and hampers, and in particular, to a wheeled laundry carrying device.

BACKGROUND OF THE INVENTION

Doing laundry is one of the most hated chores performed in many households. The lengthy process is difficult, time consuming, and repetitive. For those that must transport the laundry to and from another area of their home or to and from a distant self service laundromat, the task is even more daunting due to having to carry heavy baskets. Additional items such as laundry detergents, fabric softeners, hangers, and even reading material must also be brought to distant locations. All of this material means that people must carry the heavy basket without a clear view of the floor in front of them which could lead to a nasty fall. Even the youngest and fittest of people have difficulty with such a task. Those of us who are older or disabled may find such a task nearly impossible.

There have been many attempts to provide laundry baskets intended to address these problems. A common solution is to provide at least two (2) wheels to one (1) end of the basket or even provide four (4) wheels to the outside corners of the basket. While these attempts may achieve their purported objective each suffers from one (1) or more disadvantage or deficiency related to design or utilization. Particularly, these attempts do not easily allow for multiple baskets to be stacked when not in use. Additionally exterior wheels prevent the basket from resting flat on the floor or other surface in situations when the wheels may not be desired.

SUMMARY OF THE INVENTION

The inventor has therefore recognized the aforementioned inherent problems and lack in the art and observed that there is a need for a device which allows laundry and associated items to be easily transported without the disadvantages as described above. In accordance with the invention, it is an object of the present disclosure to solve these problems.

The inventor recognized these problems and has addressed this need by developing a wheeled laundry basket which provides multiple features to aid in the task of moving heavy laundry items in a manner which is quick, easy, and effective. The inventor has thus realized the advantages and benefits of providing a basket assembly including a floor and sidewalls which define an open interior. A plurality of wheel assemblies is retractably coupled to the basket. An internal cavity disposed at each corner of the floor for housing the wheel assembles and has an opening in the floor for a wheel to partially protrude outwardly. A pull handle is connected to at least one (1) sidewall.

Each wheel assembly includes a tubular member affixed to the floor within the internal cavity. An actuator member is provided having a vertical arm slidably fit within an open top of the tubular member and a horizontal arm protruding outwardly from a sidewall opening. A shaft is slidably fit within an open bottom of the tubular member. A wheel is rotatably fastened to a lower end of the shaft and movable between a retracted state within the internal cavity and a deployed state partially protruding from the floor opening. A biasing member for biasing the wheel assembly in the retracted state. A cam mechanism is disposed between the actuator member and the shaft for positioning the wheel between the retracted state and the deployed state in response to a reciprocating longitudinal motion of the actuator member.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

Figure 1:
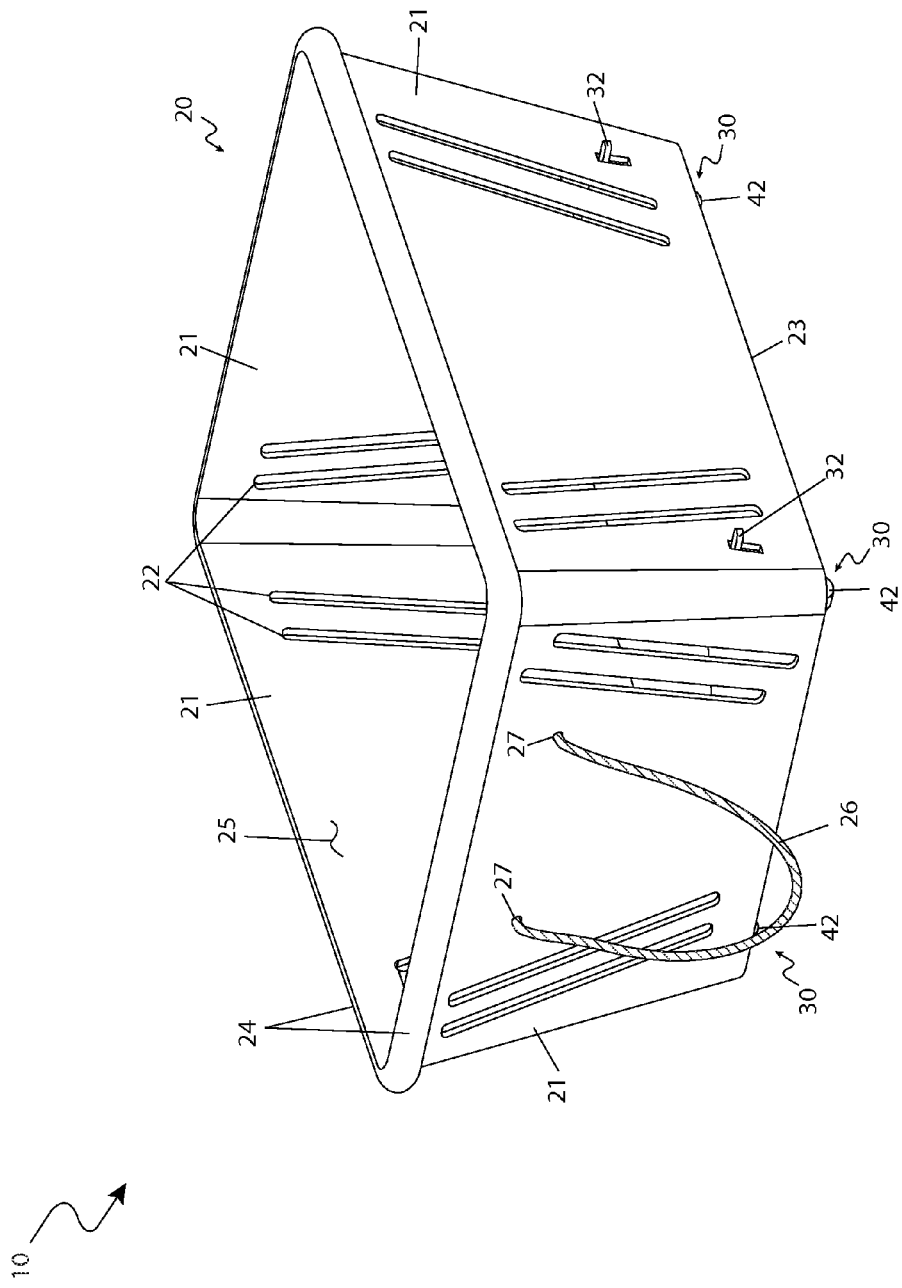
FIG. 1 is a perspective view of a wheeled laundry carrying device, according to a preferred embodiment in accordance with the invention.

| DESCRIPTIVE KEY | |
|---|---|
| 10 | wheeled laundry carrying device |
| 20 | basket assembly |
| 21 | sidewall |
| 22 | vent |
| 23 | floor |
| 24 | rim |
| 25 | interior portion |
| 26 | handle |
| 27 | aperture |
| 28 | knot |
| 29 | opening |
| 30 | wheel assembly |
| 31 | internal cavity |
| 32 | actuator member |
| 33 | stationary cam |
| 34 | tubular member |
| 35 | rail |
| 36 | rotary cam |
| 37 | rotary cam guide |
| 38 | shaft |

| | DESCRIPTIVE KEY |
|---|---|
| 39 | catch |
| 40 | spring |
| 41 | fork |
| 42 | wheel |
| 43 | axle |
| 44 | fastener |
| 45 | teeth |
| 46 | stationary cam guide |
| 47 | slot |
| 48 | notch |

DETAILED DESCRIPTION OF THE PREFERRED EMBODIMENT

In accordance with the invention, the best mode is presented in terms of a preferred embodiment, herein depicted within FIGS. 1 through 6. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

The terms "a" and "an" herein do not denote a limitation of quantity, but rather denote the presence of at least one of the referenced items.

Referring now to FIGS. 1 through 6, depicting a wheeled laundry carrying device (herein described as a "device") 10, where like reference numerals represent similar or like parts. In accordance with the invention, the present disclosure describes an open-topped container utilized for temporary storage and transport of laundry items such as, but not limited to: towels, clothes, detergent, or the like. The device 10 is utilized similarly to traditional clothes baskets or by use of the enhanced transporting features which provide a wheeled container. The device 10 facilitates transporting laundry items in a manner which is easy, effective, and quick and eliminates the need of carrying laundry to desired locations.

Figure 3:
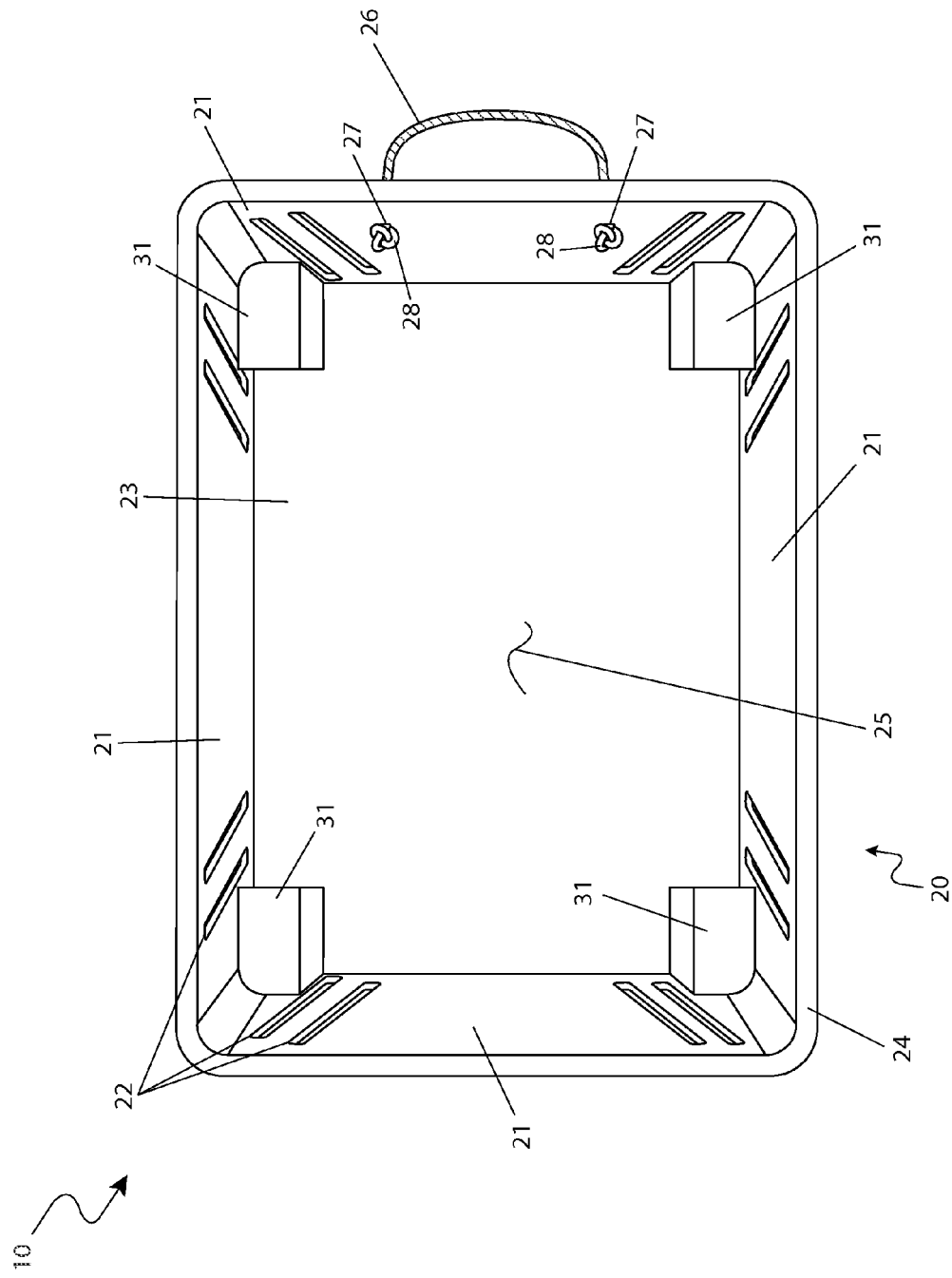
FIG. 3 is a top view of the wheeled laundry carrying device, according to the preferred embodiment.

FIG. 1 shows a perspective view and FIG. 3 shows a top view of the device 10. The device 10 includes a basket assembly 20 and a plurality of wheel assemblies 30. The basket assembly 20 preferably takes on a generally rectangular shape and is fabricated from plastic, yet other materials may be utilized without limiting the scope of the device 10. The device 10 is made available in various sizes to accommodate the necessity of the user.

Figure 2:
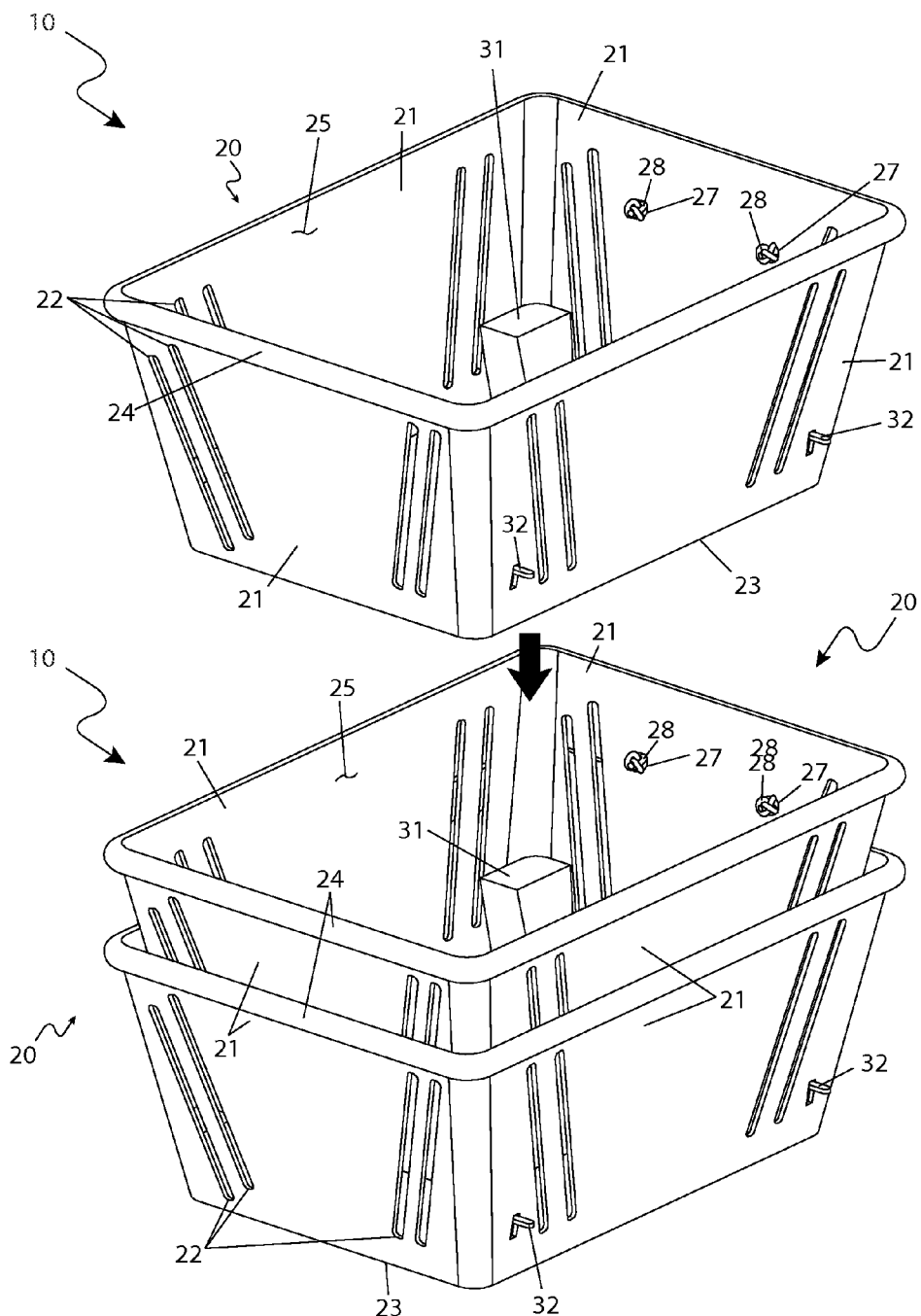
FIG. 2 is a perspective view of multiple wheeled laundry carrying device depicted in a stacked state for storage, according to the preferred embodiment.

FIG. 2 shows a perspective view of multiple devices 10 depicted in a stacked state. The basket assembly 20 includes four (4) sidewalls 21 which extend from a floor 23 to a downwardly turned rim 24. The sidewalls 21 and floor 23 define an interior portion 25 which laundry or similar items are positioned and held within. In at least one (1) embodiment of the device 10, the sidewalls 21 include a plurality of vents 22 which provide decoration and aesthetic appeal and also allow air to enter the interior portion 25 to resist mildew. Although the vents 22 are depicted as slanted, generally rectangular openings it can be appreciated that other shapes, designs, or patterns can be utilized without limiting the scope of the device 10. The rim 24 surrounds an upper periphery of the sidewalls 21 and provides a finger receiving gripping edge for the user to take hold of the basket assembly 20 for transporting in a lifting and carrying manner.

The basket assembly 20 is designed to allow multiple devices 10 to be stacked within each other (with the wheel assemblies 40 retracted) to facilitate storage, packaging, transportation, and shelving of large pluralities of device 10. The interior portion 25 of a first device 10 accepts the floor 23 of second device 10; this combination is repeated to stack multiple devices 10 in a generally vertical manner.

At least one sidewall 21 also includes a handle 26 which provides a way for the user to pull the device 10 to a desired location when the wheel assemblies 30 are in the deployed state. The handle 26 is preferably a nylon rope, yet other materials may be utilized without limiting the scope of the device 10. Each opposing end of the handle 26 is inserted into a respective aperture 27 through the sidewall 21 and fixed therewithin by a knot 28, crimp, or similar fastening mechanism to secure the handle 26 to an inner surface of the respective sidewall 21 and enable the handle 26 to create a loop so as to allow the user to grasp the handle 26 for towing the device 10 when loaded with laundry items.

Figure 4:
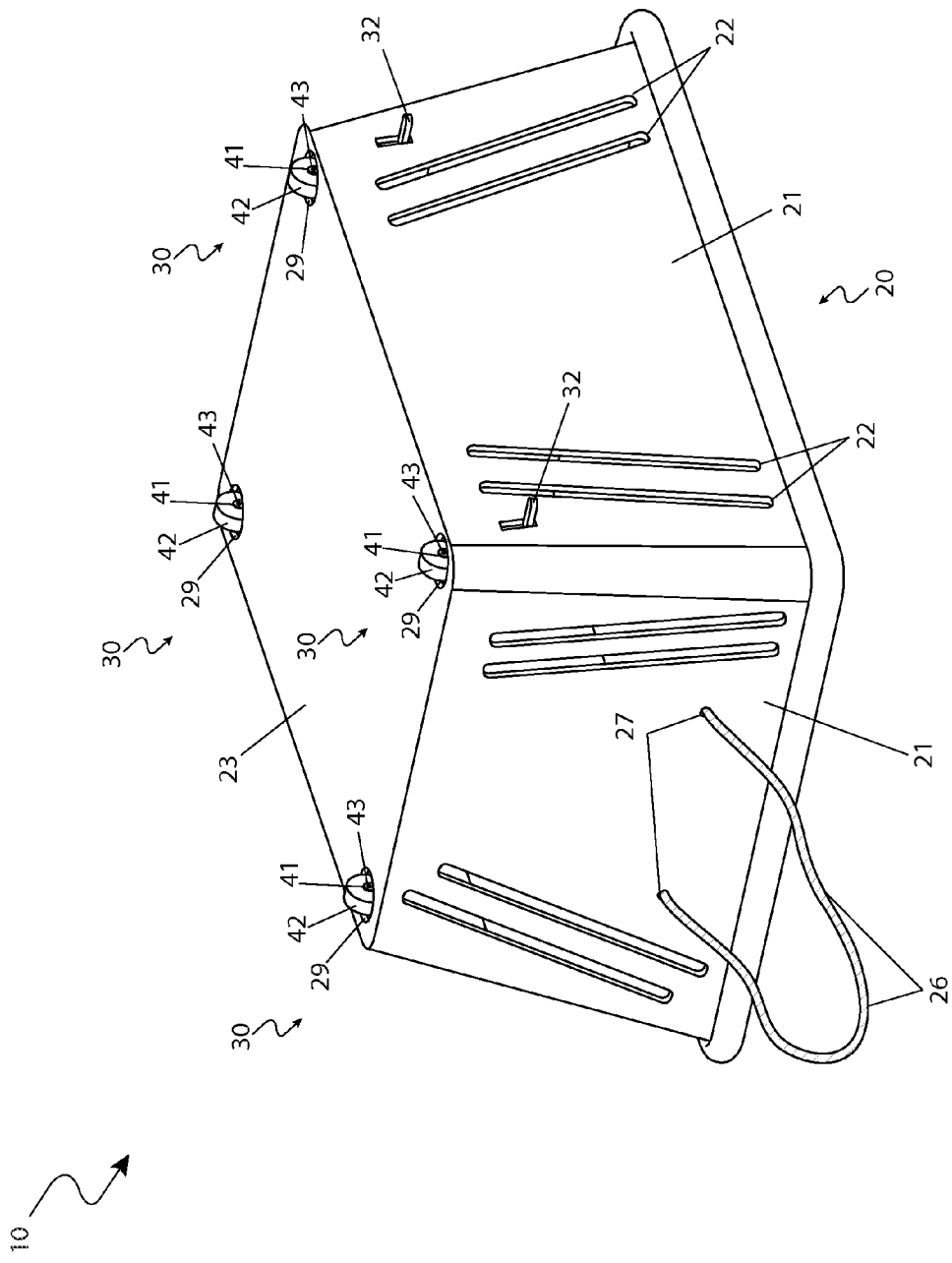
FIG. 4 is a bottom perspective view of the wheeled laundry carrying device depicting a plurality of wheel assemblies in a deployed state, according to the preferred embodiment.
Figure 5:
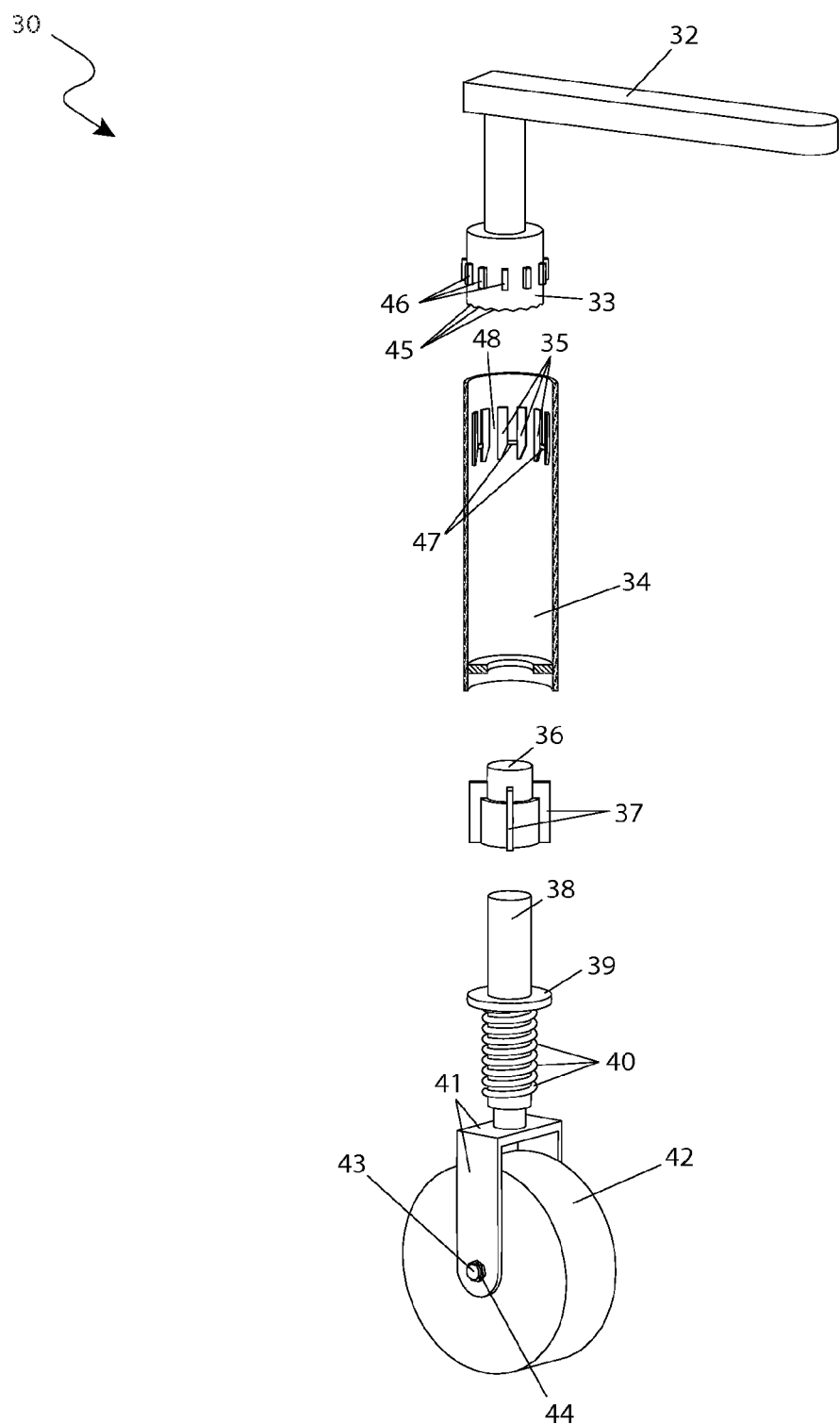
FIG. 5 is an exploded view of the wheel assembly, according to the preferred embodiment.
Figure 6:
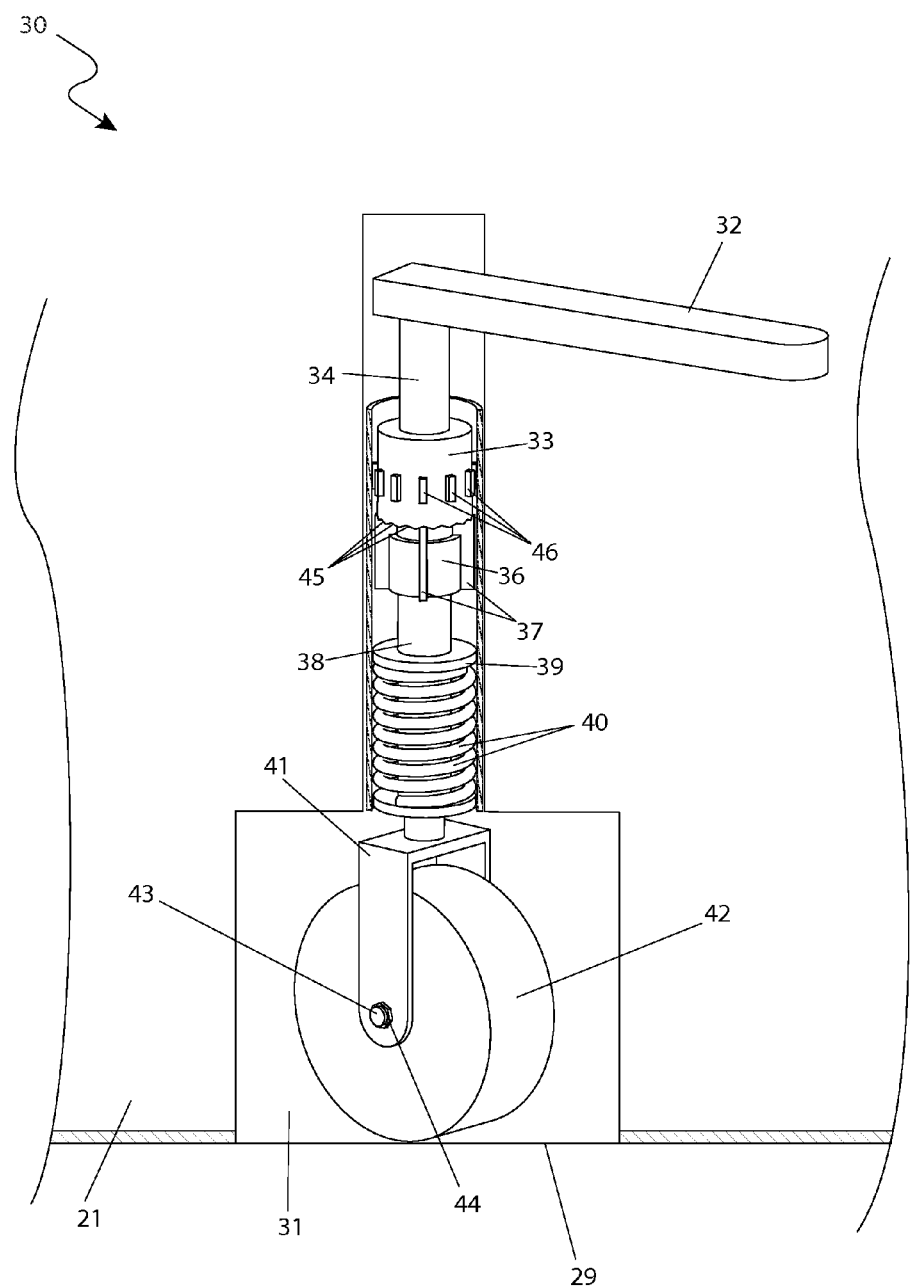
FIG. 6 is a cut-away view of a basket assembly depicting the wheel assembly in a retracted state, according to the preferred embodiment; and, FIG. 7 is a cut-away view of the basket assembly depicting the wheel assembly in the deployed state, according to the preferred embodiment.
Figure 7:
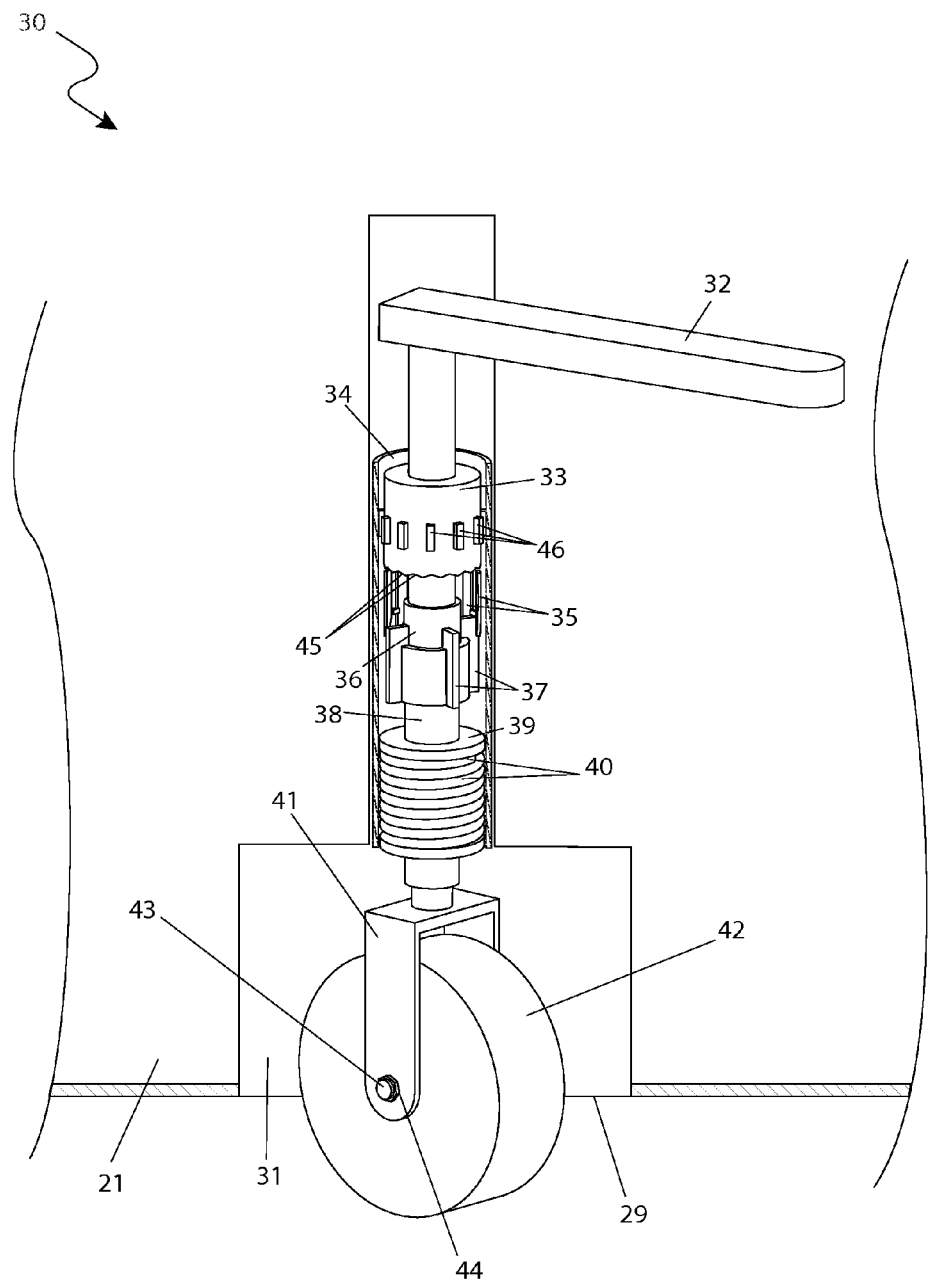

FIG. 4 shows a bottom perspective view of the device 10 depicting the wheel assemblies 30 in a deployed state; FIG. 5 shows an exploded view of the wheel assembly 30; and, FIGS. 6 and 7 shows a cut away view of the basket assembly 20 depicting the wheel assembly 30 in the retracted and deployed state, respectfully. A bottom portion of the floor 23 includes a plurality of openings 29, each of which permit a wheel 42 to retract and at least partially deploy in response to actuation of the actuation member 32. The openings 29 each provide access to the hollow internal cavity 31 disposed at each corner the floor 23 having a height dimension suitable to completely retract each wheel assembly 30 inside, such that the basket assembly 20 maintains a flat bottom surface of the floor 23 when the wheel assemblies 30 are in the retracted state.

Each wheel assembly 30 includes an actuator member 32, a stationary cam 33, a tubular member 34, a rotary cam 36, a shaft 38, a spring 40, a fork 41, and the wheel 42 which are maintained within the internal cavity 31 in the floor 23. The actuator member 32 of each wheel assembly 30 protrudes from the sidewall 21 and provides for manual retraction or deployment of the wheels 42. The actuator member 32 is generally "L"-shaped and the stationary cam 33 is affixed to a lower vertical end of the actuator member 32.

The stationary cam 33 includes a cylindrical-shape having a plurality of teeth 45 along a lower perimeter edge which engage a plurality of rotary cam guides 37 protruding radially outward from an exterior of the rotary cam 36. The stationary cam 33 and the rotary cam 36 are positioned within the tubular member 34 which is affixed to the internal cavity 31. The tubular member 34 includes a plurality of inwardly projecting rails 35 which define a slot 47 between adjacent rails 35. A plurality of stationary cam guides 46 extend radially from an exterior of the stationary cam 33. Each stationary cam guide 46 remains positioned within a single slot 47 and slides up and down, but does not rotate, in response to the actuation of the actuation member 32.

A lower end of each rail 35 terminates in a tapered point. The lower end of every other slot 47 is closed off by notching every other rail tapered point with the adjacent rail tapered point. This notch 48 prevents the rotary cam guide 37 from entering the slot 47 following a partial rotation in response to actuation of the actuation member 32.

During deployment of the wheel assemblies 30, the actuator member 30 is engaged by the user and pressed downwardly. Upon actuation of the actuator member 32, the stationary cam 33 slides downward and the teeth 45 engage the rotary cam guides 37 pushing them linearly out from the bottom of the slots 47. The compression spring 40 biases the shaft 38, and thus the rotary cam 36, upward and the rotary cam guides 37 are retained between adjacent rail tapered ends and restricted from entering the slot 47 by the notch 48.

During retraction of the wheel assemblies 30, the actuator member 32 is again depressed and the stationary cam 33 engages the rotary cam 36 and the process is repeated to partially rotate the rotary cam 36. The rotary cam guides 37 are retained between a next adjacent slot 47 and the rotary cam 36, and thus the shaft 38 and wheel 43, move upward within the internal cavity 31. The rotary cam 36 includes a hollow interior which receives the shaft 38 by a slip fit, which interconnects the wheel 42 to the actuator member 32.

The tubular member 34 includes an open top end such that the actuator member 32 and stationary cam 33 are longitudinally slidable within the tubular member 34. The tubular member 34 also includes an open bottom end, such that a lower end of the shaft 38 is also longitudinally slidable within the tubular member 34. The shaft 38 includes a pair of catches 39 which retain a top end of the spring 40 around the shaft 38. The bottom end of the tubular member 34 also includes a catch 39 disposed on an interior perimeter which retains a bottom end of the spring 40 within the tubular member 34. The spring 40 provides a spring force to the shaft 38, and thus to the wheel 42, to retract the wheel assembly 30 completely into the internal cavity 31 ever other time the actuator member 32 is depressed. The shaft 38 is integrally molded to a fork 41 which is fastened to the axle 43 of the wheel 42 by a fastener 44.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIG. 1.

The method of installing and utilizing the device 10 may be achieved by performing the following steps: acquiring the device 10; filling the interior portion 25 with desired laundry items; enabling the vents 22 to provide an air flow within the interior portion 25; grasping the rim 24 and lifting to transport the device 10 to a desired location; and utilizing the device 10 as necessary to transport laundry.

The method of installing and utilizing the wheel assembly 30 may be achieved by performing the following steps: acquiring the device 10; filling the interior portion 25 with desired laundry items; enabling the vents 22 to provide an air flow within the interior portion 25; depressing each actuator member 32 to deploy each wheel 42 from the internal cavity 31; utilizing the handle 36 to tow the device 10 to a desired location; depressing the actuator member 32 to retract the wheels 42 within the internal cavity 31 as desired; and utilizing the device 10 as necessary to transport laundry.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. A wheeled laundry carrying device comprising:
   a basket assembly, comprising:
      a generally rectangular floor; and,
      four sidewalls extending upward from said floor;
      an open interior area defined by said floor and sidewalls; and,
      an internal cavity disposed at each corner of said floor;
   a plurality of wheel assemblies retractably coupled to said basket assembly, each further comprising:
      a tubular member affixed to said floor within said internal cavity;
      an actuator member having a vertical arm slidably fit within an open top of said tubular member and a horizontal arm protruding outwardly from a sidewall opening;
      a shaft slidably fit within an open bottom of said tubular member;
      a wheel rotatably fastened to a lower end of said shaft;
      a biasing member; and,
      a cam mechanism disposed between said actuator member and said shaft; and,
   a pull handle connected to at least one sidewall;
   wherein said plurality of wheel assemblies are movable between a retracted state and a deployed state;
   wherein said biasing member biases each wheel assembly in said retracted state and said cam mechanism positions each wheel assembly between said retracted state and said deployed state;
   wherein said sidewalls further comprise an outward angle relative to said floor, such that a plurality of devices are stackable; and,
   wherein each internal cavity encloses each of said plurality of wheel assemblies and further comprises an opening in said floor such that said wheel assembly at least partially protrudes beyond said floor when in said deployed state.

2. The device of claim 1, wherein said cam mechanism further comprises:
   a stationary cam affixed to a bottom end of said actuator member vertical arm; and,
   a rotary cam rotatably coupled to a top end of said shaft and in mechanical communication with said stationary cam;
   wherein said stationary cam is longitudinally movable within said tubular member; and,
   wherein said rotary cam is longitudinally and rotatably movable within said tubular member between said retracted state and said deployed state.

3. The device of claim 2, wherein said tubular member further comprises a plurality of rails protruding inwardly from an interior surface; and,
   a slot disposed between adjacent rails;
   wherein said slots alternate between open lower ends and closed lower ends;
   wherein said slots retain said stationary cam permitting longitudinal motion and restricting rotational motion; and,
   wherein said rotary cam is rotatably positioned between said slot open lower end and said slot closed lower end by successive longitudinal motion of said stationary cam.

4. The device of claim 3, wherein said stationary cam further comprises:
   a plurality of teeth protruding downwardly from a lower edge to engage said rotary cam; and,
   a plurality of stationary cam guides protruding outwardly from an exterior surface slidable within said slots.

5. The device of claim 4, wherein said rotary cam further comprises:
   a generally hollow lower end to receive a top end of said shaft; and,
   a plurality of rotary cam guides protruding outwardly from an exterior surface;
   wherein said rotary cam guides mechanically engage said stationary cam teeth and are slidable within alternating slot open lower ends.

6. The device of claim 5, wherein said biasing member further comprises a compression spring disposed around said shaft; and,
   wherein said spring is retained to said shaft by at least one catch protruding outwardly from said shaft and is retained within said tubular member by at least one catch protruding inwardly from an interior of said tubular member.

7. The device of claim 6, wherein said pull handle further comprises a rope fastened at opposing ends to apertures disposed in said at least one sidewall.

8. The device of claim 7, wherein each of said sidewalls further comprises a plurality of vents.

9. The device of claim 8, wherein said basket further comprises a downwardly turned rim extending fully around an upper perimeter edge of said sidewalls.

10. A wheeled laundry carrying device comprising:
    a basket assembly comprising a floor and sidewalls defining an open interior;
    an internal cavity disposed at each corner of said floor further comprising an opening in said floor;
    a pull handle connected to at least one sidewall;
    a tubular member affixed to said floor within said internal cavity;
    an actuator member having a vertical arm slidably fit within an open top of said tubular member and a horizontal arm protruding outwardly from a sidewall opening;
    a shaft slidably fit within an open bottom of said tubular member;
    a wheel rotatably fastened to a lower end of said shaft and movable between a retracted state within said internal cavity and a deployed state partially protruding from said floor opening;
    a spring coupled over said shaft for biasing said wheel in said retracted state; and,
    a cam mechanism disposed between said actuator member and said shaft for positioning said wheel between said retracted state and said deployed state in response to reciprocating longitudinal motion of said actuator member.

11. The device of claim 10, wherein said spring is retained to said shaft by at least one catch protruding outwardly from said shaft and is retained within said tubular member by at least one catch protruding inwardly from an interior of said tubular member.

12. The device of claim 11, wherein said cam mechanism further comprises:
    a stationary cam affixed to a bottom end of said actuator member vertical arm; and,
    a rotary cam rotatably coupled to a top end of said shaft and in mechanical communication with said stationary cam;
    wherein said stationary cam is longitudinally movable within said tubular member state in response to said reciprocating longitudinal motion of said actuator member; and,
    wherein said rotary cam is longitudinally and rotatably movable within said tubular member between said retracted state and said deployed state.

13. The device of claim 12, wherein said tubular member further comprises a plurality of rails protruding inwardly from an interior surface; and,
    a slot disposed between adjacent rails;
    wherein said slots alternate between open lower ends and closed lower ends;
    wherein said slots retain said stationary cam permitting longitudinal motion and restricting rotational motion; and,
    wherein said rotary cam is rotatably positioned between said slot open lower end and said slot closed lower end by successive longitudinal motion of said stationary cam.

14. The device of claim 13, wherein said stationary cam further comprises a plurality of teeth protruding downwardly from a lower edge to engage said rotary cam and a plurality of stationary cam guides protruding outwardly from an exterior surface slidable within said slots; and,
    wherein said rotary cam further comprises a generally hollow lower end to receive a top end of said shaft and a plurality of rotary cam guides protruding outwardly from an exterior surface;
    wherein said rotary cam guides mechanically engage said stationary cam teeth and are slidable within alternating slot open lower ends.

15. The device of claim 14, wherein said sidewalls further comprise an outward angle relative to said floor, such that a plurality of devices are stackable.

16. The device of claim 15, wherein said pull handle further comprises a length of flexible cord fastened at opposing ends to apertures disposed in said at least one sidewall.

* * * * *